US009113756B2

(12) United States Patent
Shaw

(10) Patent No.: US 9,113,756 B2
(45) Date of Patent: Aug. 25, 2015

(54) PORTABLE AND BIODEGRADABLE TOILET SUCH AS FOR USE BY FIELD PERSONNEL

(71) Applicant: Raymond R. Shaw, Farmington Hills, MI (US)

(72) Inventor: Raymond R. Shaw, Farmington Hills, MI (US)

(*) Notice: Subject to any disclaimer, the term of this patent is extended or adjusted under 35 U.S.C. 154(b) by 304 days.

(21) Appl. No.: 13/692,146

(22) Filed: Dec. 3, 2012

(65) Prior Publication Data
US 2013/0139311 A1 Jun. 6, 2013

Related U.S. Application Data

(60) Provisional application No. 61/566,094, filed on Dec. 2, 2011.

(51) Int. Cl.
*A47K 11/04* (2006.01)
*A47K 11/02* (2006.01)

(52) U.S. Cl.
CPC ...................... *A47K 11/02* (2013.01)

(58) Field of Classification Search
CPC ....... A47K 11/00; A47K 11/02; A47K 11/04; A47K 13/005; E04H 1/12
USPC ............ 4/144.1–144.3, 450–486; 297/440.12
See application file for complete search history.

(56) References Cited

U.S. PATENT DOCUMENTS

| 3,600,719 | A | * | 8/1971 | Karr .................................. 4/476 |
| 3,731,869 | A | * | 5/1973 | Griffin ........................... 229/111 |
| 4,633,536 | A | * | 1/1987 | Tribble-DuBose ............... 4/460 |
| 5,048,130 | A | * | 9/1991 | Brotman et al. .................. 4/483 |
| 5,524,301 | A |   | 6/1996 | McGuire |
| 5,682,623 | A | * | 11/1997 | Fenoglio ........................... 4/483 |
| 5,860,704 | A | * | 1/1999 | Smith ..................... 297/440.12 |
| 6,081,943 | A | * | 7/2000 | Garcete .............................. 4/476 |
| 6,115,855 | A | * | 9/2000 | Lorenzo ........................... 4/484 |
| 2009/0038066 | A1 |   | 2/2009 | Kallmann et al. |
| 2009/0044325 | A1 |   | 2/2009 | Sell |
| 2009/0165199 | A1 |   | 7/2009 | Heumann |
| 2010/0180370 | A1 | * | 7/2010 | Helewa ............................. 4/484 |
| 2010/0275362 | A1 |   | 11/2010 | Biesinger et al. |
| 2012/0102636 | A1 |   | 5/2012 | West |

* cited by examiner

*Primary Examiner* — Paul R Durand
*Assistant Examiner* — Nicholas Ros
(74) *Attorney, Agent, or Firm* — Gifford, Krass, Sprinkle, Anderson & Citkowski, P.C.

(57) ABSTRACT

A portable toilet constructed of a sanitary and biodegradable material assembled from a multi-paneled and foldable blank material into a body having a bottom, interconnecting sides and a top with a centrally defined aperture. The blank construction includes a pair of mating flaps within which are configured carrying handle apertures. A fold over lid exhibits three interconnected edges and an inner facing engagement tab for maintaining the lid in a closed position relative to the top and upper side edges of the body. A reinforcing insert is positioned within the open interior of the body during its three dimensional assembly and includes pairs of spaced apart, length extending and opposite edge interconnecting and strength inducing panels which are arrayed in vertically extending fashion and which, in use, protect against collapse of the body.

10 Claims, 10 Drawing Sheets

PORTABLE AND BIODEGRADABLE TOILET SUCH AS FOR USE BY FIELD PERSONNEL

CROSS REFERENCE TO RELATED APPLICATIONS

The present application claims the priority of U.S. Ser. No. 61/566,094 filed Dec. 2, 2011.

FIELD OF THE INVENTION

The present invention relates generally to a portable toilet. More specifically, the present invention discloses a portable toilet, such as for use by field personnel, and which exhibits limited reusability and biodegradability in disposal.

DESCRIPTION OF THE BACKGROUND ART

The inability to access toilet facilities is a problem often encountered by people located in outdoor environments. These include such as campers, hikers, and hunters, as well as notably law enforcement field personal involved in such as observation or long-term surveillance activities.

Examples of portable toilets exhibiting a biodegradable material are known and include such as the systems shown in Biesinger et al. 2010/0275362 and Kallmann et al. 2009/0038066. Additional relevant examples of the prior art include the biodegradable and foldable/disposable toilet of McGuire U.S. Pat. No. 5,524,301. Heumann 2009/0165199 teaches a related portable, disposable and recyclable toilet.

SUMMARY OF THE PRESENT INVENTION

The present invention discloses a portable toilet constructed of a sanitary and biodegradable material including any of a corrugated paperboard and/or a degradable plastic which is assembled from a multi-paneled and foldable blank material to acquire a three dimensional shaped body exhibiting a bottom, interconnecting sides and a top through which is centrally defined an aperture. The blank construction further includes a pair of mating flaps within which are configured carrying handle apertures, as well as a fold over lid with three interconnected edges and an inner facing engagement tab for maintaining the lid in a closed position relative to the top and upper side edges of the body.

A reinforcing insert is positioned within the open interior of the body during its three dimensional assembly. The insert includes pairs (typically four) of spaced apart, length extending and opposite edge interconnecting strength inducing panels which are arrayed in vertically extending fashion and which, in use, protect against collapse of the body.

An absorbent, diaper lining-like, material is placed within the body such that it extends along at least the bottom and, optionally, the inner facing four sides of the reinforcing insert. A plurality of individual and thin ply plastic liners are provided and are typically held within a dispensing receptacle supported upon a side of the assembled body or a supporting base upon which the body is positioned.

Individual liners are dimensioned such that outer edges thereof engage over the top and upper sides of the body with the central portions thereof defining a volume entrapping pouch extending through the aperture within the open interior of the body. An elastic band can be provided which applies around the perimeter of the body in order to bias an outer skirt portion of each sheet (or multiple sheets which are supported in stacked fashion), which extend over the interconnected sides of the body.

A vertical height adjusting support base associated with the body can include either of an outer box receptacle within which the body is positioned in a desired elevated fashion. The base can alternately be configured as a support tray with downwardly foldable legs. A multi-tissue dispenser can be provided, either secured to the body or support base as a receptacle similar in profile to that holding the plurality of thin ply liners. Alternatively, a standard toilet roll can be supported along a side of the base.

Other features include provision of a hot welded application during assembly of the multi-blank panels. A sanitary spray application can be applied to at least one of exterior and interior surfaces of the body.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

As will be described in additional detail throughout the several succeeding embodiments, the present invention discloses a portable toilet such as for use by field personnel, and which exhibits limited reusability and biodegradability in disposal. The construction and configuration of the portable toilet is such that it provides the aspects of convenience in transport and use (such as in particular in remote outdoor conditions in which access to a normal toilet is either unavailable or impracticable). In particular, the portable toilet design is particularly advantageous for use by field personnel (including civilian law enforcement and military) involved in surveillance activities, as well as being useful for hunters and other outdoor minded individuals.

Referring now to the illustrations, and initially to each of FIGS. 1, 4, 6 and 7, an illustration is generally depicted of a body 10 of a portable toilet in an assembleable and carryable configuration. As additionally shown in FIG. 8 the portable toilet is constructed of a die cut blank material, such as a biodegradable and durable paperboard, and exhibits a multi-panel arrangement which is foldable/manipulate-able into the three dimensional body 10.

Figure 7:
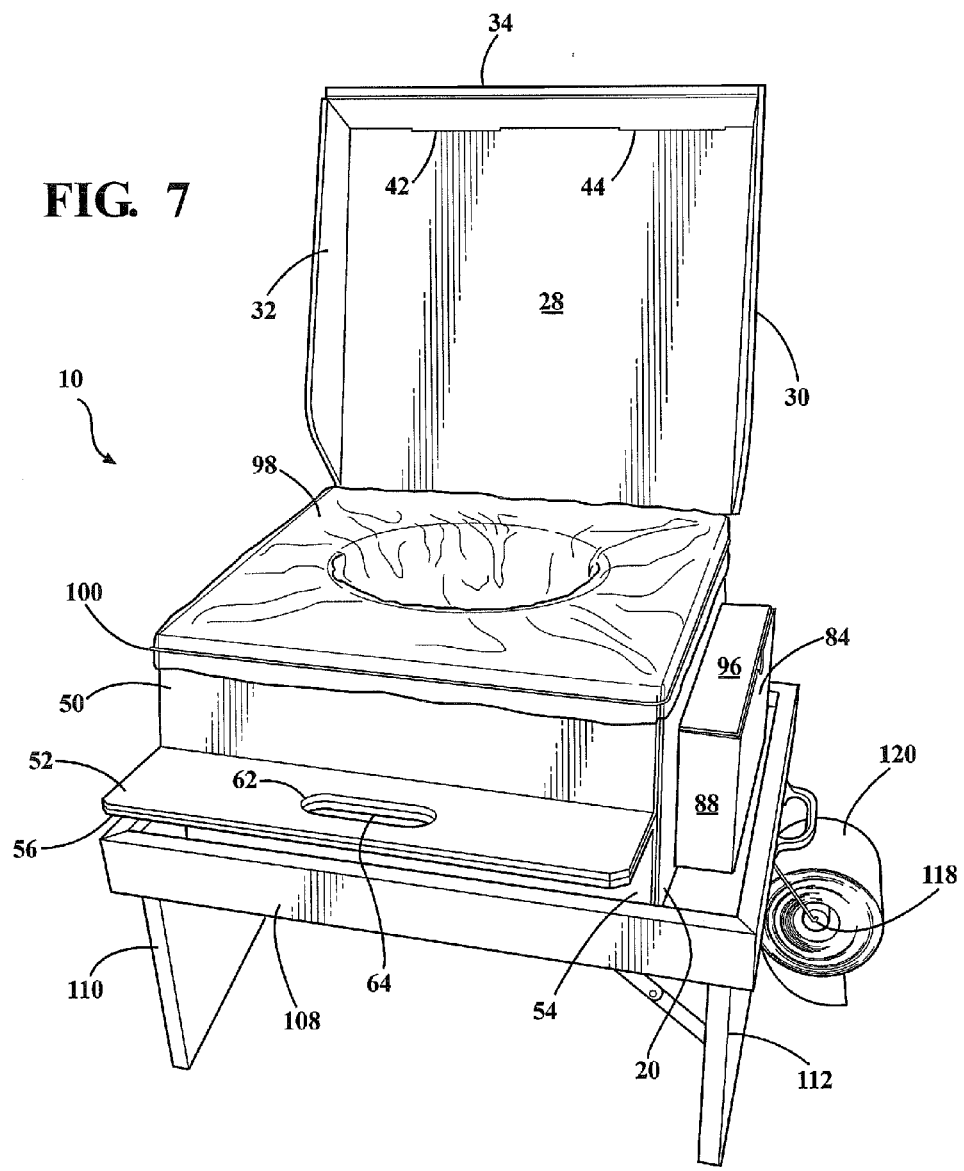
FIG. 7 is an illustration of the assembled body with disposable liner installed and which is supported upon the pedestal base of FIG. 5.
Figure 8:
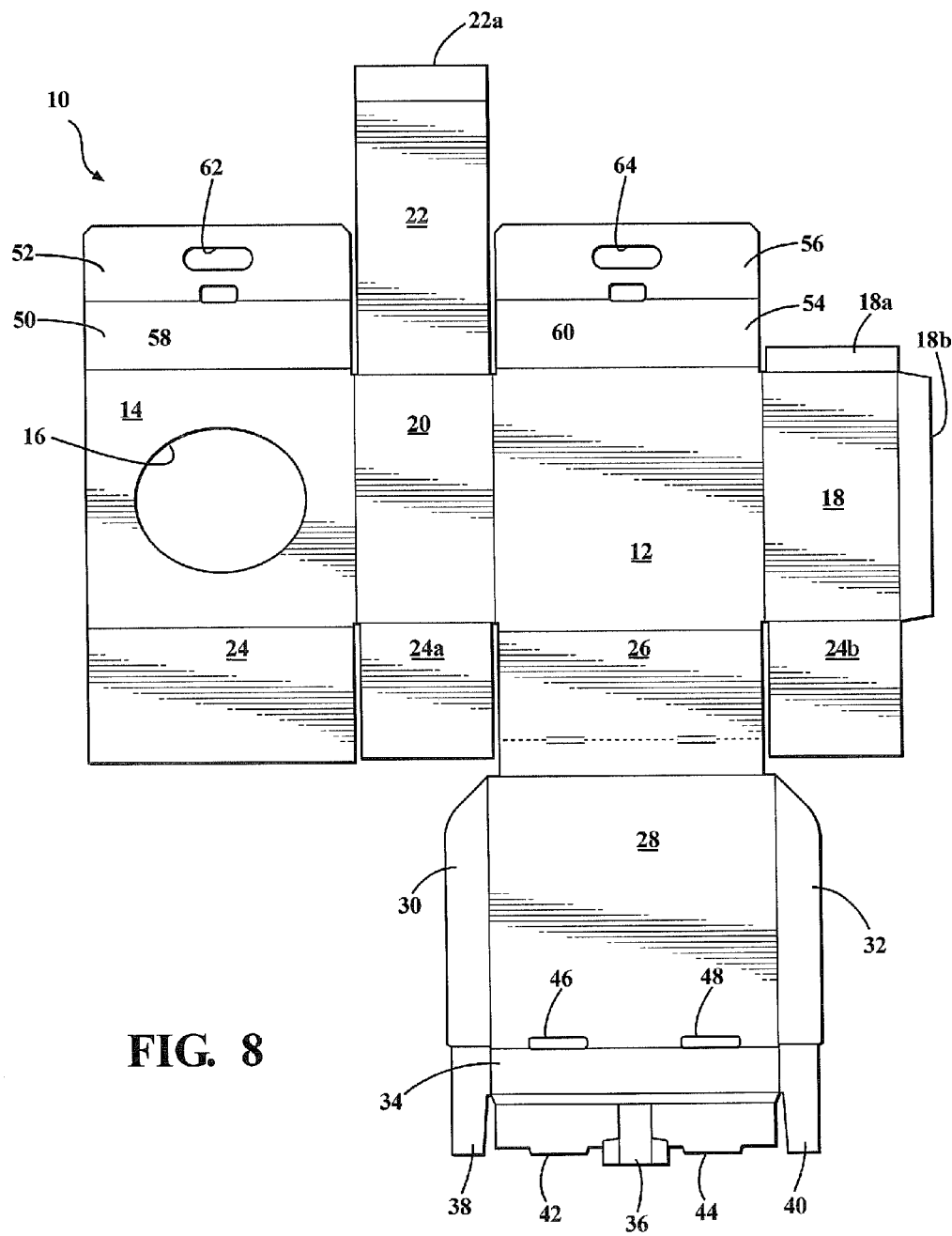
FIG. 8 is a depiction of the multi-panel construction of the blank assembleable into the three dimensional shaped body.

Viewing the blank of FIG. 8 in combination with the assembled perspectives of FIGS. 1, 4, 6 and 7, the multi-panel interconnected body includes a bottom 12 and a top 14 (within which is defined an inner aperture perimeter defining edge 16). Additional side panels 18, 20, 22 and 24, as well as split side panels 24a and 24b which overlap the fourth side panel 24. An outermost portion of the side panel 22 also includes a foldable flap edge 22a extending from one edge, with selected split panel 24a extending from the other. Split panel 24b likewise extends from an edge of opposite side panel 18, with additional flap edges 18a and 18b extending along second and third interconnecting edges of the panel 18 in order to facilitate three dimensional assembly.

A further panel 26 extends from the top 14, beyond the overlapping 24 and 24a/24b panels, and terminates in a lid 28. The lid 28 in turn includes foldable outer edge portions 30, 32 and 34 which define a three sided lip which overlays the upper facing perimeter edge of the top 14.

As best shown again in FIG. 8, an additional foldable flap, defined by locations 36, 38 and 40, is associated with an extending location along an interconnecting foldable edge associated with the middle extending portion 34, and such that it is rotated underneath so that middle edge projecting tabs further indicated at 42 and 44 seat within spaced apart slots 46 and 48 defined along an inner foldable edge defined between the central panel 34 and the top 28. A center located feature (again at 36) of the outermost middle flap further defines a catch which can be configured to inter-fit with a mating configuration or profile defined along a top or forward side edge of the main body, such as notch or slit configured into a location of the body which aligned with the lid edge 34 being folded to the closed position and within which projecting edges of the feature 36 can be releasably or frictionally engaged, this in order to maintain the lid 28 in a closed position when folded over the top 14 (see FIG. 4).

Additional split flaps 50 & 52 and 54 & 56 are best depicted in the laid out blank configuration of FIG. 8 and which extend from parallel aligning edges of the top 14 and bottom 12, respectively. Snap fit engaging profiles are further shown at 58 and 60 for mating the pairs of split flaps together along intermediate fold lines and such that a pair of cutout edges 62 and 64 defines carrying handle locations. Also, and upon assembling to the configuration shown in FIG. 1, the inside mating edges of the outer located flaps 52 and 56 can exhibit a tacky or adhesive in order to maintain them in a permanently closed and inter-adhering position.

Figure 1:
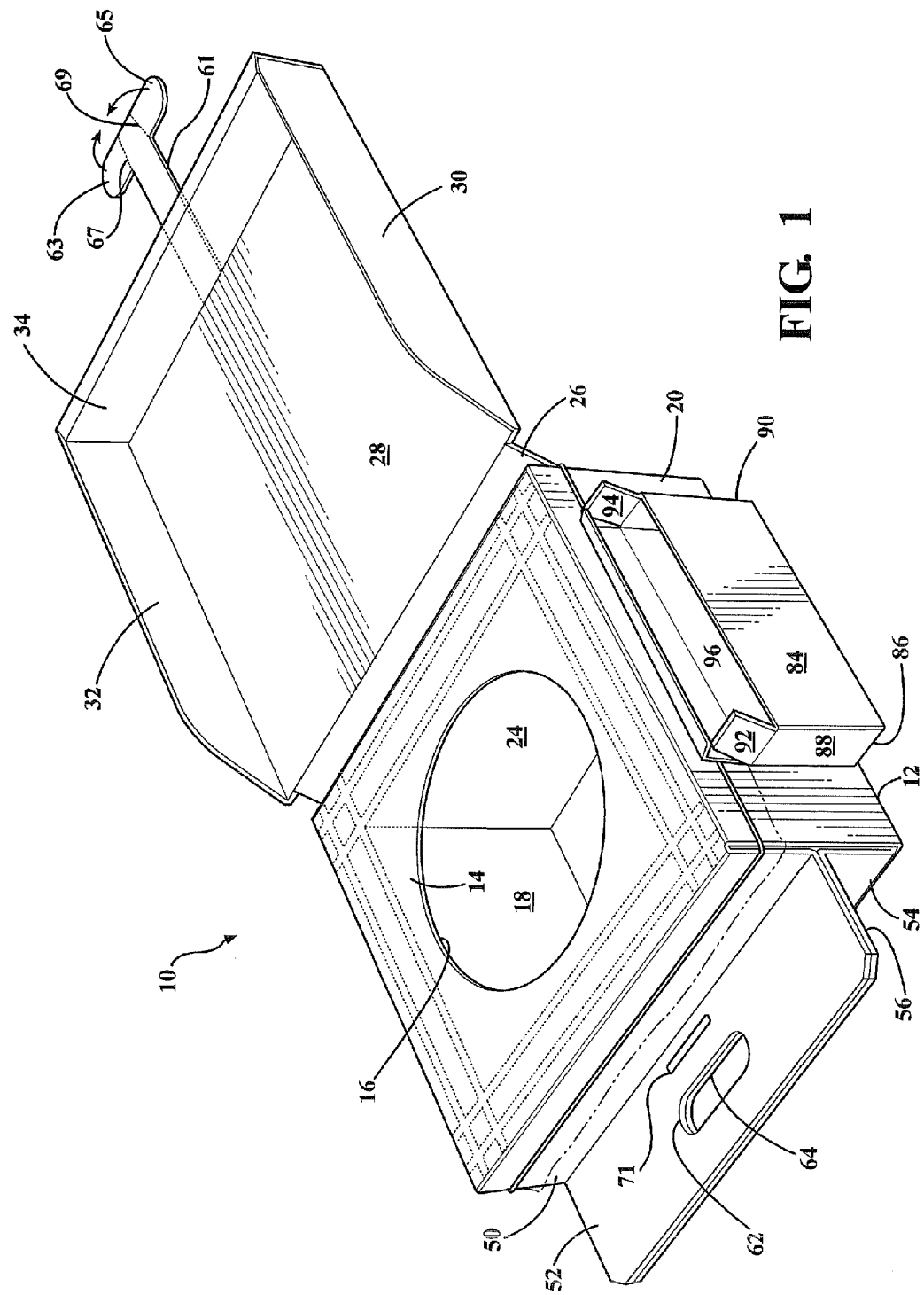
FIG. 1 is a perspective illustration of a portable toilet in an assembled and carryable configuration according to a first embodiment.

FIG. 1 additionally depicts an alternate configuration of engagement structure for affixing the lid 28 to the main body and includes an integral extending strap portion 61 forming a portion of the die cut blank (this substituting for the alternate profile depicted at 36 in FIG. 8) and which extends from a generally central location of the middle extending portion 34 of the lid 28. The strap 61 defines, at its remote extending end, a pair of laterally extending wing portions 63 and 63, these in turn being bendable or otherwise foldable (see directional arrows) about score lines 67 and 69 lengthwise formed into the wings in alignment with the lateral edges of the strap 61.

In this fashion, the wings 63 and 65 can be folded inwardly and the lid 28 rotated to a closed position, whereupon the folded ends of the strap 61 can be fitted through a pair of overlapping and aligning slits or inner scored edges (see for example at 71 for flap 52) defined in the mating outer flap portions 52 and 56. Upon passing through a reverse exterior face of the lower positioned flap 56, the wings 63 and 65 can be rotated outwardly in order to maintain the lid 28 in the closed position over the top 14, and without impairing either the ability to carry the body through the aperture defining handholds 62 and 64 or to reverse disengage the strap 61 and wing portions through the slits 71 in order to open the lid. Alternative constructions associated with the die cut strap 61 can also include the use of flexible or other resilient monomer containing materials, such as including rubber or soft plastic, and which can be defined with or separately secured to the main body in order to provide an easy mechanism for reclosing or opening the hingedly associated lid relative to the body.

Figure 3:
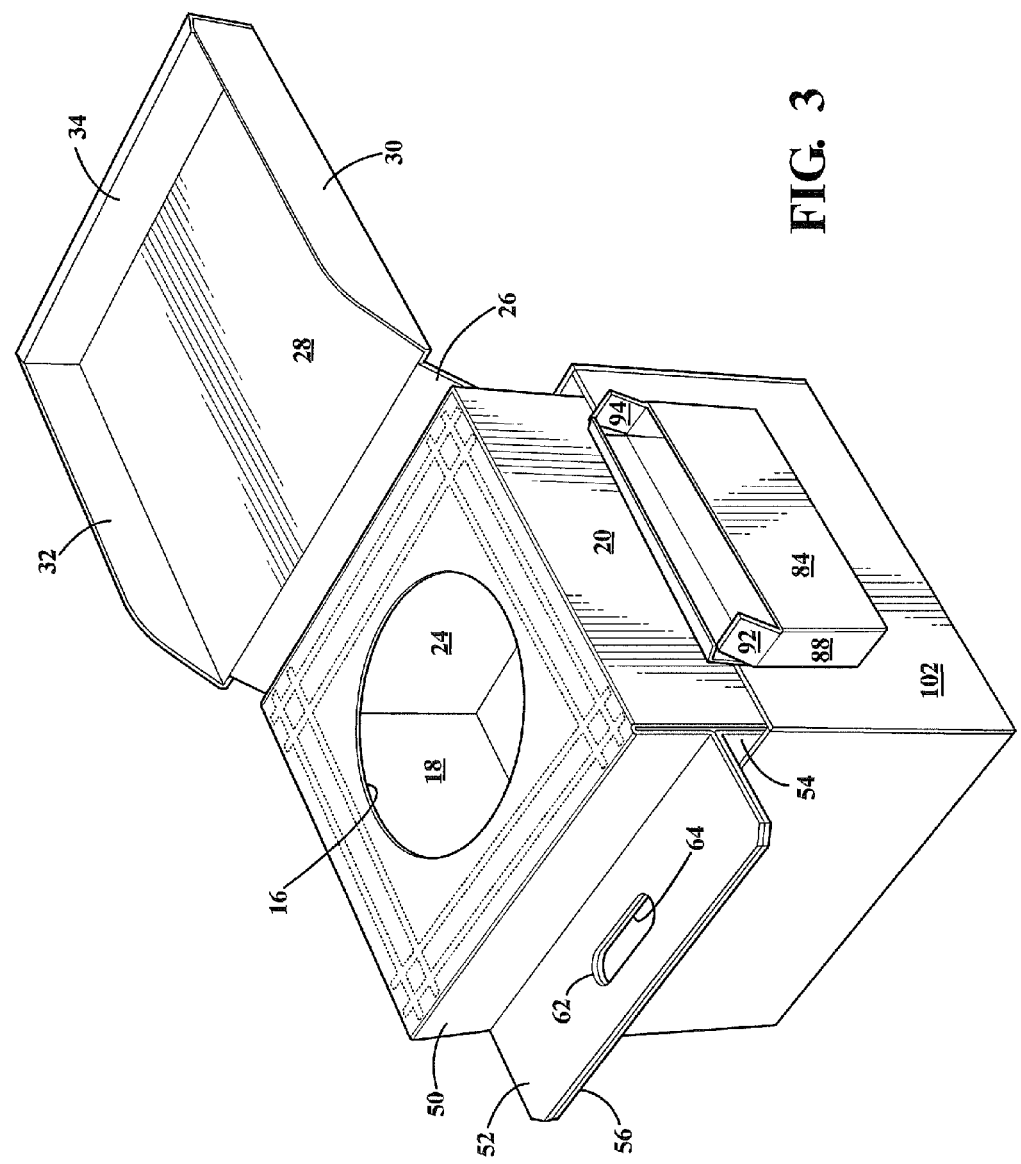
FIG. 3 is an illustration of the body and spacing pedestal base of FIG. 2 arranged in a use position and depicting the in phantom the perimeter edge extending and reinforcing insert.
Figure 4:
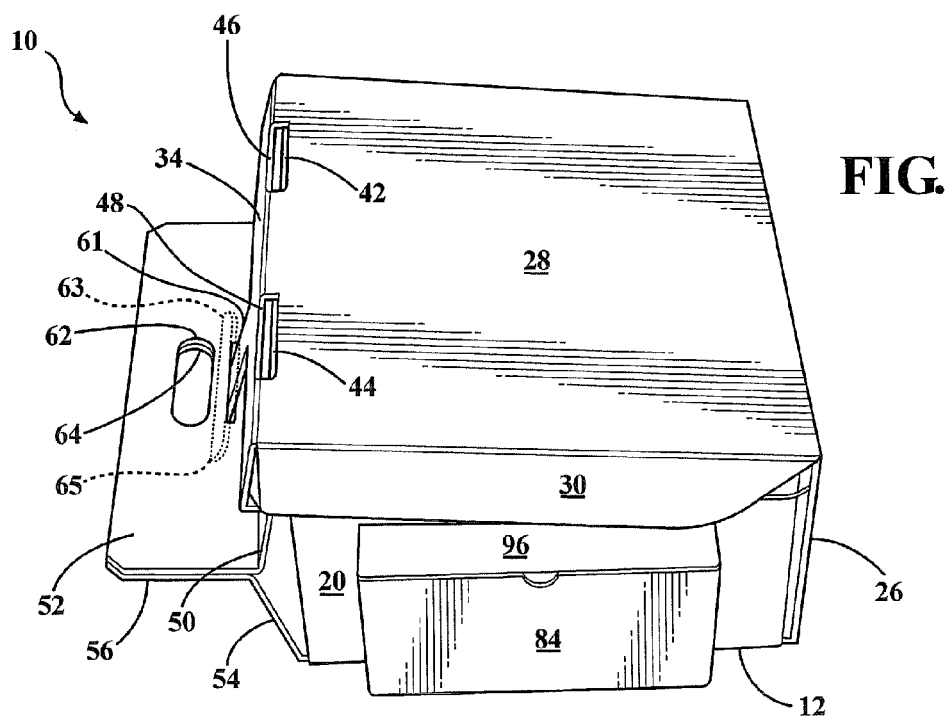
FIG. 4 is a rotated perspective of the body shown in FIG. 1 and depicting the fold over flap in a closed and engaged fashion relative to a top of the body.
Figure 11:
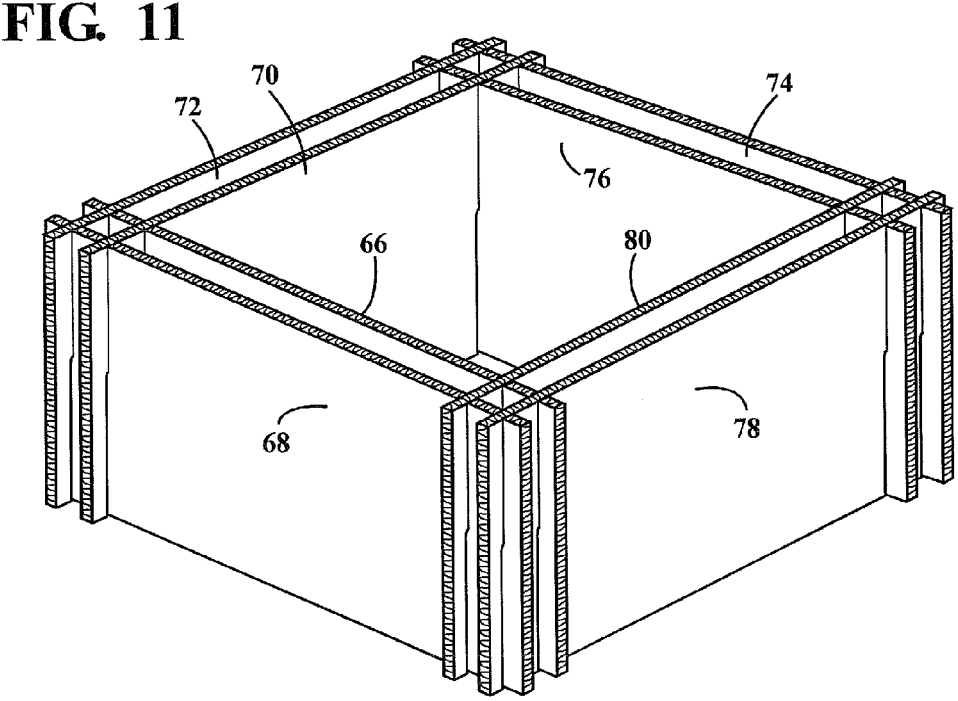
FIG. 11 is a three dimensional illustration of a reinforcing insert.
Figure 12:
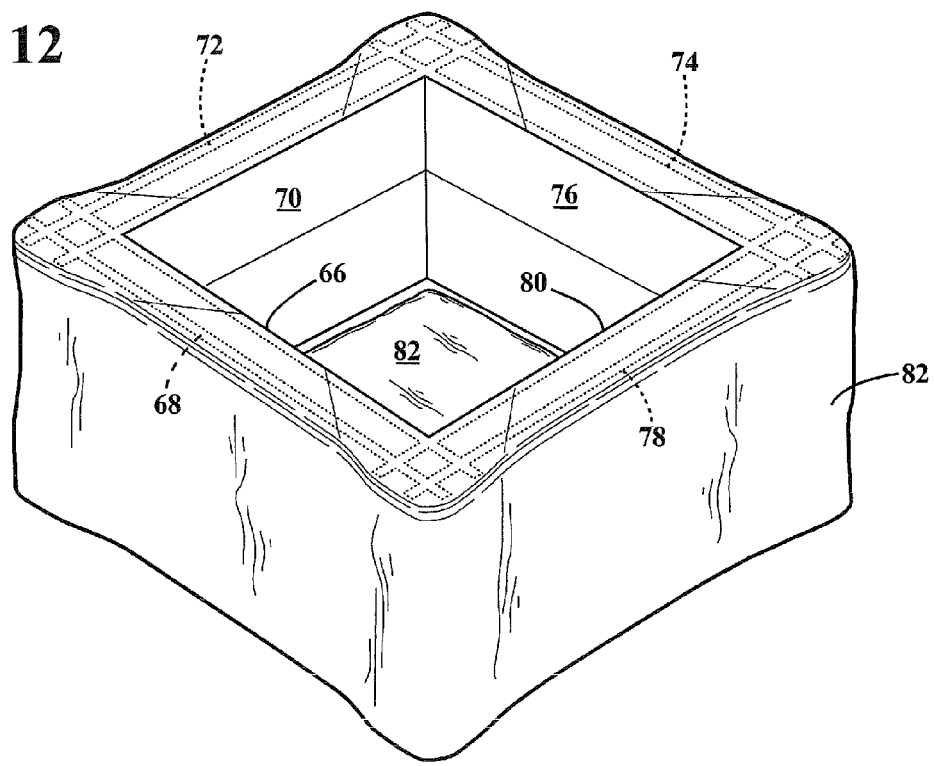
FIG. 12 is a succeeding illustration of an insert combined with an inner positioned liner material and an overlaying flexible ply material.

As shown in FIGS. 11 and 12, as well as in phantom in each of FIGS. 1 and 3, a reinforcing insert is positioned within the open interior of the body (upon the bottom 12) during its three dimensional assembly. The insert includes pairs (typically four) of spaced apart, length extending and opposite edge interconnecting strength inducing panels, see at 66/68, 70/72, 74/76 and 78/80, which are arrayed in vertically extending fashion and which establish overlapping edge profiles.

An absorbent, diaper lining-like, material 82 (see FIG. 12) is placed within the body such that it extends along at least the bottom 12 and, optionally, the innermost positioned and interconnecting panels 66, 70, 76 and 80 defining the inner facing four sides of the reinforcing insert. As also shown in FIG. 12, a covering liner or drape 82 is shown which can be dimensioned to overlay the insert, such as to prevent the admittance integrity degrading moisture, and which is preassembled in the manner shown prior to the surrounding three dimensional assembly of the body 10.

The construction of the body is further such that the various panels and folding edge portions can be assembled without the requirement of adhesives or tapes. That said, it is envisioned that additional retaining features including any form of strip adhesive or other tacky component can be included for assisting in the assembly of the body panels and/or the sealing of the overlaying lid, such as following final use of the assembly.

A plurality of individual and thin ply plastic liners are provided and are typically held within a dispensing receptacle, an example of which is depicted in FIG. 1 and includes interconnecting side panel 84, bottom panel 86, side panels 88 and 90 edge flaps 92 and 94 and overlaying top panel 96. Then secondary dispensing receptacle is supported upon a side of the assembled body or a supporting base upon which the body is positioned.

Individual liners, such as depicted at 98 in FIG. 7, is dimensioned so that outer edges thereof engage over the top 14 and uppermost portions of the interconnecting sides 18, 20, 22 and 24 of the body. A central portion of the liner 98 is further depicted defining a volume entrapping pouch extending through the aperture within the open interior of the body. An elastic band 100 is provided which applies around the perimeter of the body in order to bias an outer skirt of each sheet (or multiple sheets which are supported in stacked fashion) which extends over the interconnected sides of the body.

Figure 2:
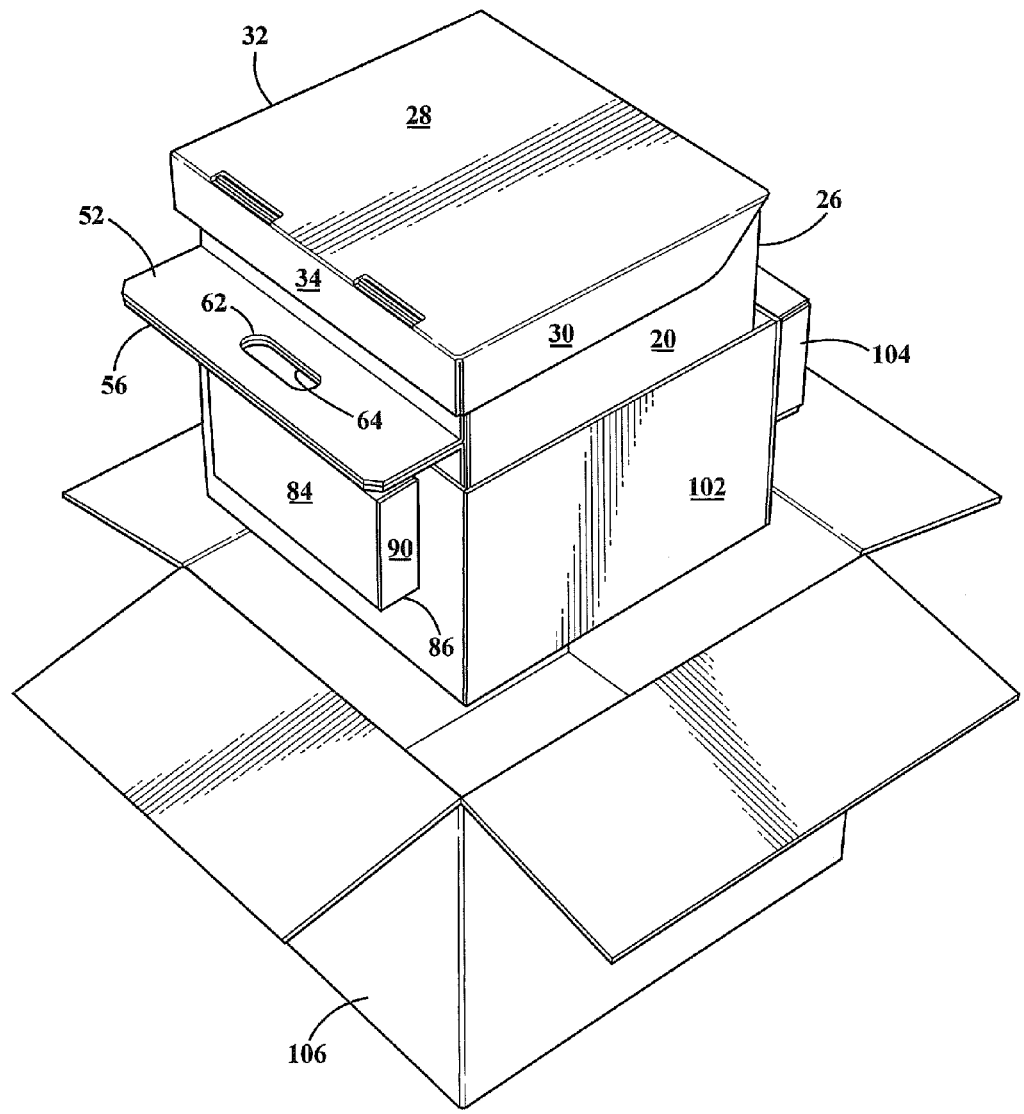
FIG. 2 is a succeeding illustration to FIG. 1 and depicting the body supported upon a vertically spacing base in exploded fashion upon a storage and transport box.

A vertical height adjusting support base can optionally be associated with the body and, in a first example shown in FIGS. 2 and 3, can include a four sided outer box receptacle 102 within which the body 10 is positioned in a desired elevated fashion. The outer box 102 can also include either one or two secondary receptacles, this including that defined by flaps 84-96 as well as along a second opposite edge located receptacle as further depicted at 104 (these being repositioned from the body 10 itself in the variant of FIG. 1). FIG. 2 further depicts an outer storage box or container, depicted at 106 and including a square or rectangular inner enclosure with four edge extending and over-folding flaps, within which the body 10 and/or the height adjusting pedestal base 102 is stored.

Figure 5:
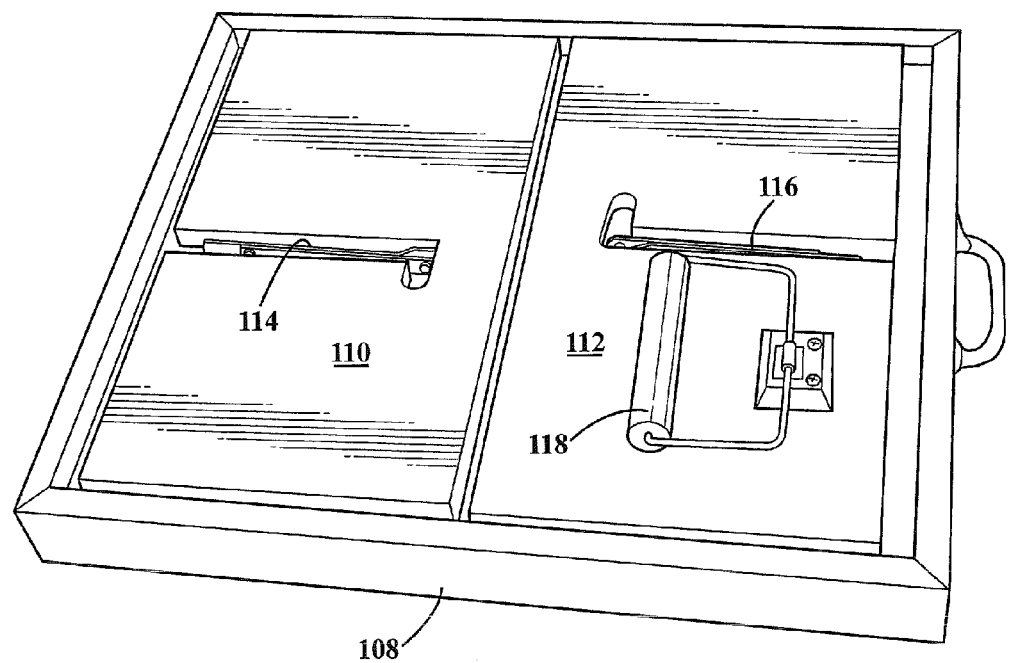
FIG. 5 is a further variant of pedestal supporting base including a tray and legs in a folded and portable configuration.
Figure 6:
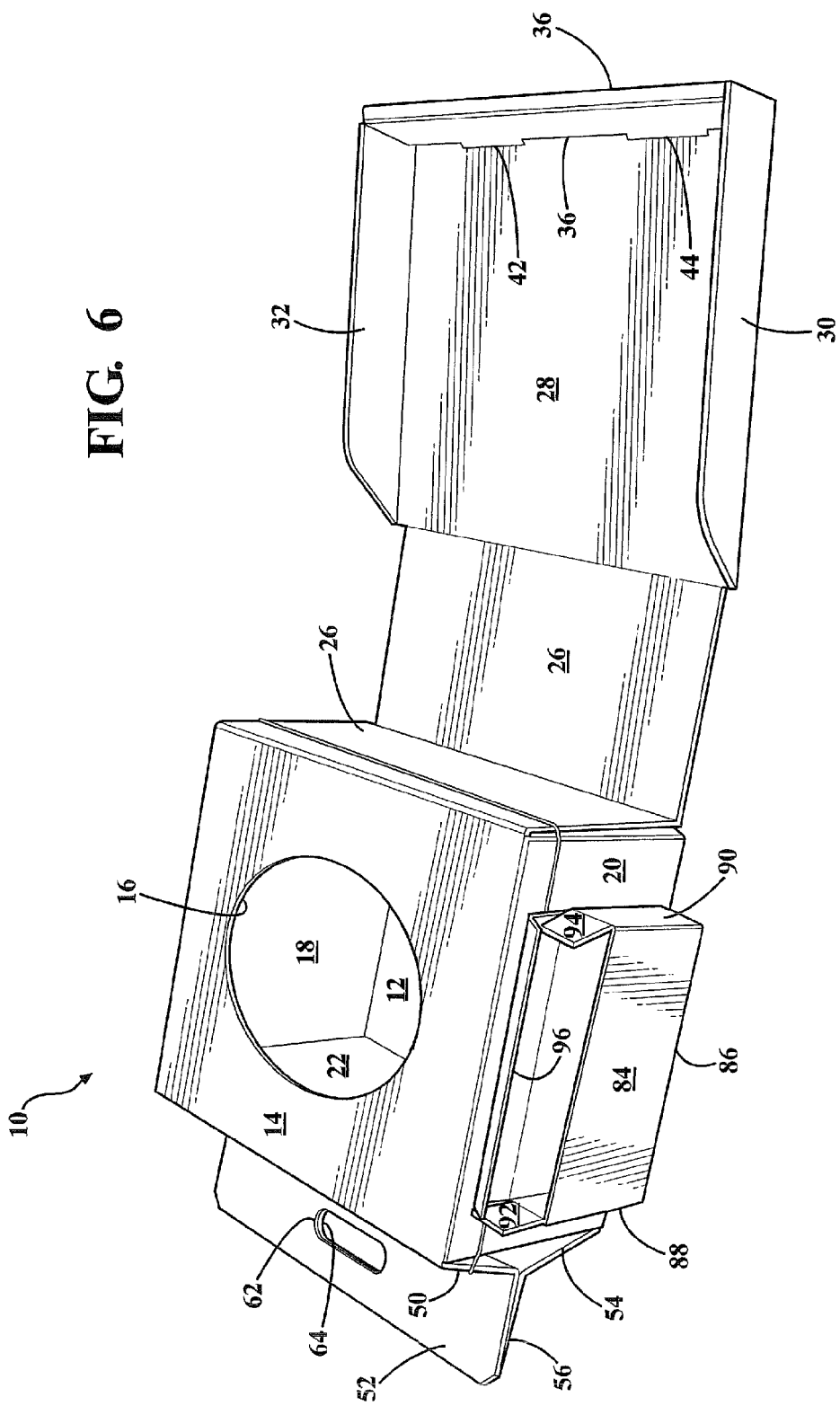
FIG. 6 is an illustration in perspective of the body in FIG. 1 shown in a substantially assembled configuration and with the lid and connecting flap extended relative to the three dimensional defined body.

As further shown in FIGS. 5 and 7, the pedestal base can alternately be configured as a support tray 108 with downwardly foldable and hinge engageable legs 110 and 112 (see also hinges 114 and 116 associated with legs 114 and 116 for converting between the closed and opened positions). A multi-tissue dispenser 118 can be provided, either secured to the body in pivotal fashion for holding a conventional toilet roll 120 (FIG. 7) or alternatively secured to a support base as a secondary receptacle similar in profile to that depicted at 104 in FIG. 2.

Figure 9:
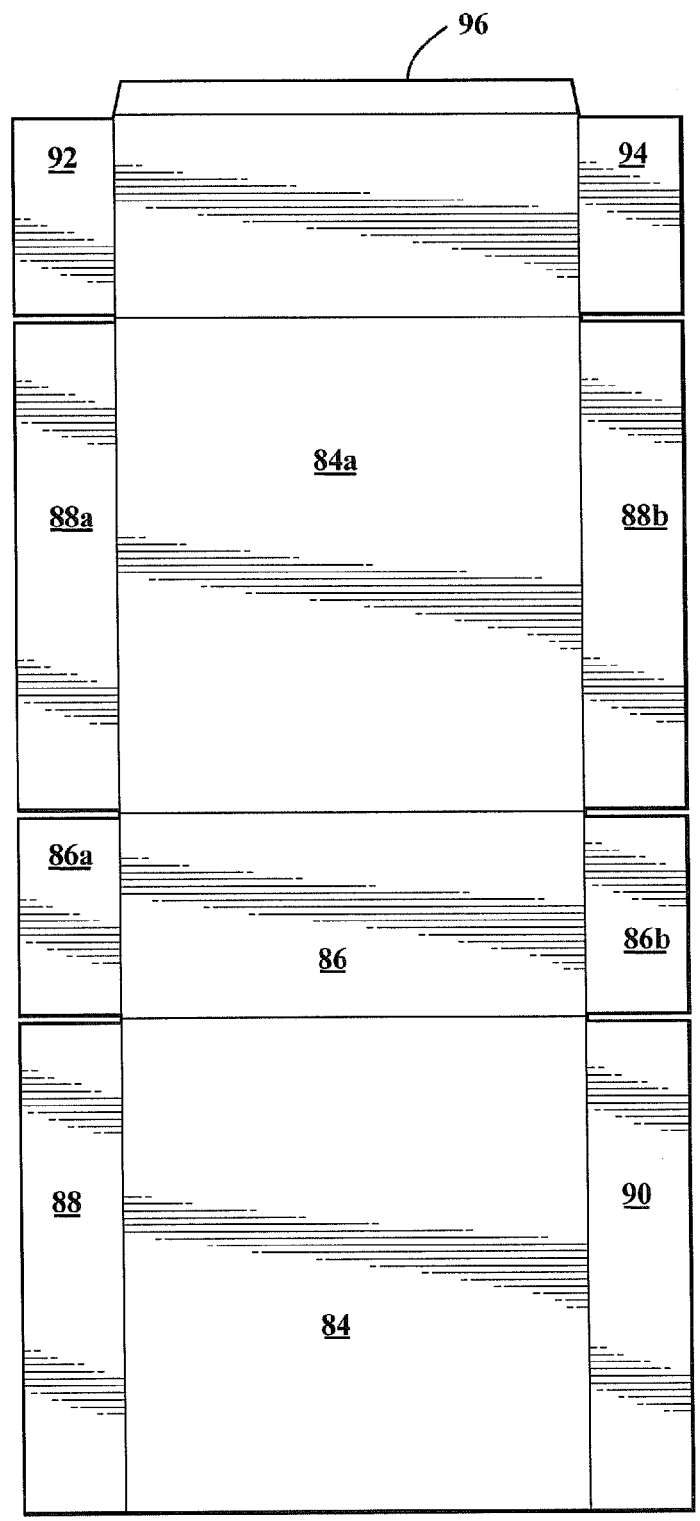
FIG. 9 is a further blank depiction of a secondary receptacle secured to a side of the body or base and which can contain either of a plurality of sanitary wipes or thin ply liners.

FIG. 9 is a further blank depiction of a secondary receptacle such as previously depicted and which can be secured to a side of the body or base and which can contain either of a plurality of sanitary wipes or thin ply liners. Additional to the flaps 84-92 which were previously recited in the assembled version of the secondary receptacle, FIG. 9 additionally includes an inner spaced side flap 84a with over folding inner flaps 88a and 88b which, along with inwardly folding bottom edge flaps 86a and 86b complete the construction of the secondary enclosure which can be secured by any of adhesives or fasteners to a side of the main body 10 or supporting pedestal base.

Figure 10:
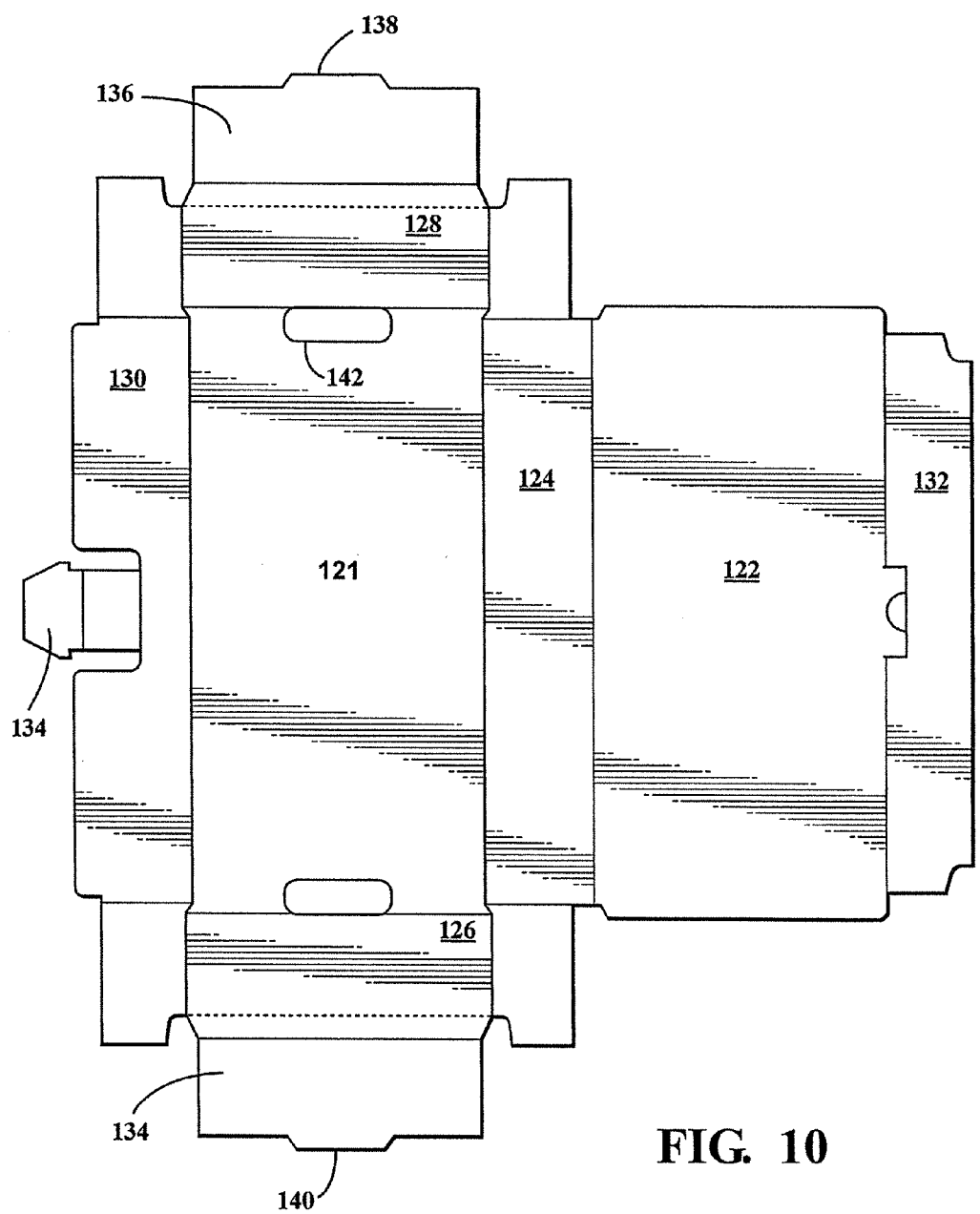
FIG. 10 is an alternate blank construction for a secondary product receptacle.

FIG. 10 is an alternate blank construction for a holding a secondary product receptacle and which can include a plurality of interconnected panels including vertical faces 121 and 122, bottom 124, sides 126 and 128 and top 130. A fold over flap 132 associated with the face 122 receives a tab 134 configured into the opposite edge top flap 130 and, in combination with additional side flaps 134 and 136 with outer end depicting tabs 138 and 140, fold inwardly to engage with inner fold edge slots 142 and 144 to assist in creating a secondary receptacle enclosure which is similar to that depicted at 104 in FIG. 2, and which can be secured to a desired location in order to hold a plurality of disposable liners and/or sanitary wipes.

Other optional features include provision of a hot welded application during assembly of the multi-blank panels. A sanitary spray application can be applied to at least one of exterior and interior.

Additional and associated method assembly steps contemplate hot welding or otherwise inter-engaging the foldable panels associated with the blank design in order to further assist in creating a durable and load bearing support. Additional process steps contemplate a sprayable or other suitable application of a biodegradable sealant, such as along the outer and inner surfaces of the portable toilet, such as in order to further enhance the sanitary aspects of the toilet during use and disposal. It is also envisioned that the material construction can also extend to plastic or other polymeric composites, as well as potentially use of a single material employing a combination or successive laminate layering of a rigid paperboard and non-organic polymeric based material, such further including any degree of engineered biodegrade-abilty.

Having described my invention, other and additional preferred embodiments will become apparent to those skilled in the art to which it pertains, and without deviating from the scope of the appended claims.

I claim:

1. A portable toilet, comprising:
    a body having a three dimensional base including a top with an inner defined aperture;
    a structurally supporting insert including a plurality of interlocking panels which is installed within said assembled body, said insert defining an open central interior for receiving a volume of an absorbent material placed within said base;
    a pair of handle flaps extending from each of top and bottom defined panels associated with said base, aligning cutouts in said flaps facilitating carryability; and
    a lid hingedly secured to an edge of said base and convertible from a first position overlaying said base to a second position revealing said top.

2. The toilet as described in claim 1, further comprising a plurality of inserts for successive use within said base interior.

3. The toilet as described in claim 1, further comprising a sanitary spray application applied to at least one of exterior and interior surfaces of said body.

4. The toilet as described in claim 1, said body further comprising a multi-panel and assemblable blank.

5. The toilet as described in claim 4, further comprising a hot welded application during assembly of said multi-blank panels.

6. A portable toilet constructed of a sanitary and biodegradable material, comprising:
    a multi-paneled and foldable blank material defining a three dimensional shaped body exhibiting a bottom, interconnecting sides and a top through which is centrally defined an aperture;
    a pair of mating flaps extending from a selected side and within which are configured carrying handle apertures;
    a fold over lid with three interconnected edges, said lid being pivotally associated with said body along a fourth interconnecting edge; and
    a strap extending from a central one of said interconnected edges about said lid, said strap defining an end profile which is adapted to being fitted through a slit defined in said body for maintaining the lid in a closed position relative to said top and upper side edges of said body.

7. The portable toilet as described in claim 6, said strap further comprising a pair of end positioned and laterally extending wings, these in turn being bendable or otherwise inwardly foldable during installation through said slit, said wings subsequently being rotated outwardly to maintain said lid in the closed position over said top.

8. The portable toilet as described in claim 6, further comprising a reinforcing insert positioned within the open interior of the body during its three dimensional assembly.

9. The portable toilet as described in claim 8, said insert further comprising four pairs of spaced apart, length extending and opposite edge interconnecting strength inducing panels which are arrayed in vertically extending fashion and which, in use, protect against collapse of said body.

10. The portable toilet as described in claim 9, further comprising an absorbent lining placed within said body such that it extends along at least said bottom and said inner facing four sides of said reinforcing insert.

\* \* \* \* \*